(12) United States Patent
Soni et al.

(10) Patent No.: US 6,285,674 B1
(45) Date of Patent: Sep. 4, 2001

(54) HYBRID DISTRIBUTED BROADCAST AND UNKNOWN SERVER FOR EMULATED LOCAL AREA NETWORKS

(75) Inventors: Dipak M. L. Soni, London; Peter A. Saunderson, Berkhamsted, both of (GB); Vincent Gavin; Anne O'Connell, both of Dublin (IE)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/007,833

(22) Filed: Jan. 15, 1998

(30) Foreign Application Priority Data

Jan. 17, 1997 (GB) .................................... 9701010

(51) Int. Cl.[7] .................................... H04L 12/56
(52) U.S. Cl. .......................... 370/390; 370/406; 370/395
(58) Field of Search .................................... 370/390, 395, 370/406, 401, 402, 409

(56) References Cited

U.S. PATENT DOCUMENTS 5,805,805 * 9/1998 Civanlar et al. ..................... 370/409

FOREIGN PATENT DOCUMENTS

0797331 A2  9/1997 (EP) .
0854658 A2  7/1998 (EP) .

OTHER PUBLICATIONS

Barnes J et al.: "IP Multicast of Real–Time MPEG Over ATM" Computer Networks and ISDN Systems, NL, North Holland Publishing. Amsterdam, vol. 28, No. 14, p. 1929–1936.

Bernabei F et al.: Two Heuristics for Multicasting in ATM Networks: GB, London, Champman and Hall, p. 455–466.

* cited by examiner

*Primary Examiner*—Wellington Chin
*Assistant Examiner*—Maikhanah Tran
(74) *Attorney, Agent, or Firm*—Nixon & Vanderhye P.C.

(57) ABSTRACT

A communication system comprises a plurality of interfaces disposed for sending data packets by way of virtual circuit connections and for receiving data packets by way of virtual circuit connections in an asynchronous transfer mode. The interfaces by means of the virtual circuit connections emulate at least one local area network including unit for establishing a virtual circuit connection functioning as a BUS (broadcast and unknown server) for the broadcast of data packets throughout the emulated local area network. An asynchronous transfer mode switch receives packets by way of virtual circuit connections from each of said the interfaces, replicates the packets and sends them to all the other interfaces, thus to establish a mesh between said interfaces. At least one interface comprises a unit for mapping virtual circuit connections between one interface and at least one terminal which is not directly connectable in the mesh connection into virtual circuit connections in the mesh.

1 Claim, 4 Drawing Sheets

HYBRID DISTRIBUTED BROADCAST AND UNKNOWN SERVER FOR EMULATED LOCAL AREA NETWORKS

FIELD OF THE INVENTION

This invention relates to data communication systems and particularly to an interface between a local area network, and a system which operates in an asynchronous transfer mode, which conveys data in virtual circuits according to a time shared process which allows a multiplicity of different messages to be transmitted over a single path in a time-shared manner, the messages being in the form of packets composed of cells, there being no regular or prescribed spacing between the cells.

BACKGROUND OF THE INVENTION

Although communication systems usually known as local area networks ('LANs') have reached considerable sophistication, they are known to have various shortcomings which prevent their use as the number of users increase. The development of asynchronous data transfer promises to be a versatile and convenient solution to the difficulties of providing a large scale communication network which enables concurrent use by a great multiplicity of users. At the present time there is a large number of local area networks in use and, notwithstanding their limitations, they are convenient for small organizations or local data transfer. Furthermore, it is expected that local area networks conforming to the agreed formats and protocols will remain in widespread use for many years to come. In order to use the vast base of existing software that is particular to local area networks yet obtain the advantages of data transfer in asynchronous transfer mode, it is desirable to provide a service or mode of operation which may be called local area network emulation, in which, among other aspects, end systems such as work-stations, servers, bridges etc can be connected to an asynchronous transfer mode network while the software which the local area network uses functions as if it were used in an ordinary local area network. In other words, the asynchronous transfer mode system is transparent to the users of the local area network or networks to which it is connected. Each emulated local area network (ELAN) is composed of a set of 'local area network emulation clients', each of which is an entity which performs data forwarding, address resolution and other control functions and which may be part of an asynchronous transfer mode end station, and a single local area network emulation service in accordance with the ATM Forum: Lan Emulation over ATM Specification.

One function that an asynchronous transfer mode link needs to provide in emulating local area networks is a virtual circuit, normally called a Broadcast and Unknown Server (BUS) circuit or channel, which enables packets to be broadcast to all the members of an emulated lan. It is also a means of transmitting unicast packets before the resolution of an addresses of an incoming packet which has a destination address expressed in local area network terms (i.e. an ethernet address or a token ring address) and which needs eventually to be expressed in terms of a virtual circuit number. The resolution of the destination address (often termed 'media access control address) requires, in general, the broadcast (using a control channel) of a request for address resolution to all the members of the respective emulated lan and an appropriate reply in a manner which is not directly relevant to the present invention. It will be apparent that this necessary technique is liable to cause the 'BUS' to become a potential restriction on the flow of signal traffic, because it can become too heavily loaded.

SUMMARY OF THE INVENTION

The present invention intends to provide a technique in which each ELAN provides some of the functional capability of a BUS circuit by enabling each of its members to send packets to an asynchronous transfer mode switch which is connected so as to replicate the packets and to dispatch them to all the other members of the emulated lan using a point-to-multipoint connection. By this means it is possible to provide a mesh of connections, each from a lan emulation 'client' (abbreviated herein to 'LEC') to the other 'clients' of the emulated lan; the mesh can act in the same way as a virtual BUS and relieve the load that would otherwise be experienced by such a BUS. A similar mesh can be established for each emulated lan in the system.

However the requirements for a device to participate in a BUS service are not in themselves sufficient to enable it to form meshes in the convenient manner indicated and it is a further object of the invention to provide a means for enabling a device (hereinafter called an 'interchange LEC') that can be used in such a mesh to act as a 'BUS' for a device (hereinafter called 'terminal LEC') that cannot be so used directly. An interchange LEC can provide a point-to-multipoint connection to each LEC in the ELAN (emulated local-area network) and can receive traffic on many channels from the mesh. A terminal LEC provides only one connection to a BUS and one connection from a BUS.

DETAILED DESCRIPTION

A lan emulation service, i.e. a system in which members of at least one lan may communicate with each other using the signal formats, protocol and software pertinent to the lan, but in which the lan is emulated by an asynchronous transfer mode network, needs to provide a number of lan emulation service functions, one per emulated lan, a number of BUS functions, one per emulated lan, and the lan emulation clients, as defined above.

Figure 1:
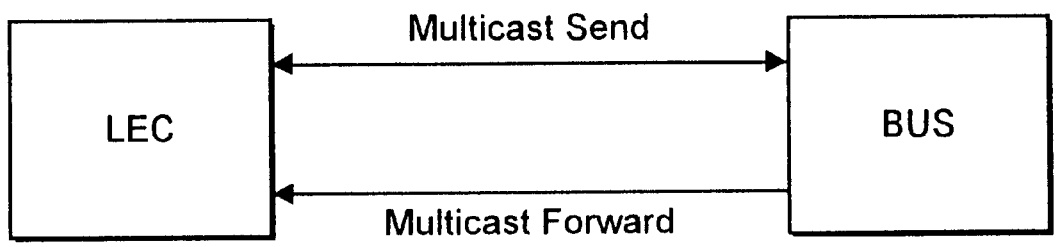
FIG. 1 is a schematic drawing showing a known form of BUS connection.

A BUS or 'Broadcast and Unknown Server' is essentially a facilitator of broadcasting in an asynchronous transfer mode network. As is shown in FIG. 1, each lan emulation client (LEC) has two connections to its BUS, the connections being conveniently termed a 'multicast send' which is a bidirectional virtual circuit connection for transmission of packets to the BUS, and 'multicast forward' for receiving packets from the BUS. The latter could be either a point-to-point or a point-to-multipoint connection at the discretion of the BUS.

The BUS receives packets from a lan emulation client, replicates them and sends them to other lan emulation clients serviced by it.

Various copending applications (O'Connell et al.—entitled METHOD OF SUPPORTING UNKNOWN ADDRESSES IN AN INTERFACE FOR DATA TRANSMISSION IN AN ASYNCHRONOUS TRANSFER MODE; O'Neill et al.—entitled METHOD FOR DISTRIBUTING AND RECOVERING BUFFER MEMORIES IN AN ASYNCHRONOUS TRANSFER MODE EDGE DEVICE; O'Connell; et al.—entitled METHOD FOR ALLOCATING NON-BUS CHANNELS FOR MULTIMEDIA TRAFFIC IN ASYNCHRONOUS TRANSFER MODE; Casey et al—entitled METHOD FOR SELECTING VIRTUAL CHANNELS BASED ON ADDRESS PRIORITY IN AN ASYNCHRONOUS TRANSFER MODE DEVICE and Creedon et al.—entitled METHOD AND APPARATUS FOR BUFFER MANAGEMENT IN VIRTUAL CIRCUIT SYSTEMS, all of which have a common assignee herewith and are of even date herewith, and which are incorporated by reference herein, disclose that in order to establish connections with its BUS, a lan emulation client first sends out a request (called an 'arp' request) to resolve the broadcast address (e.g. all 1's), in response to which the lan emulation client will receive the asynchronous transfer mode address of the BUS. The lan emulation client then sets up the multicast send virtual circuit using the asynchronous transfer mode address. The act of opening the multicast send virtual circuit will cause the BUS to establish a 'multicast forward virtual circuit'.

Figure 2:
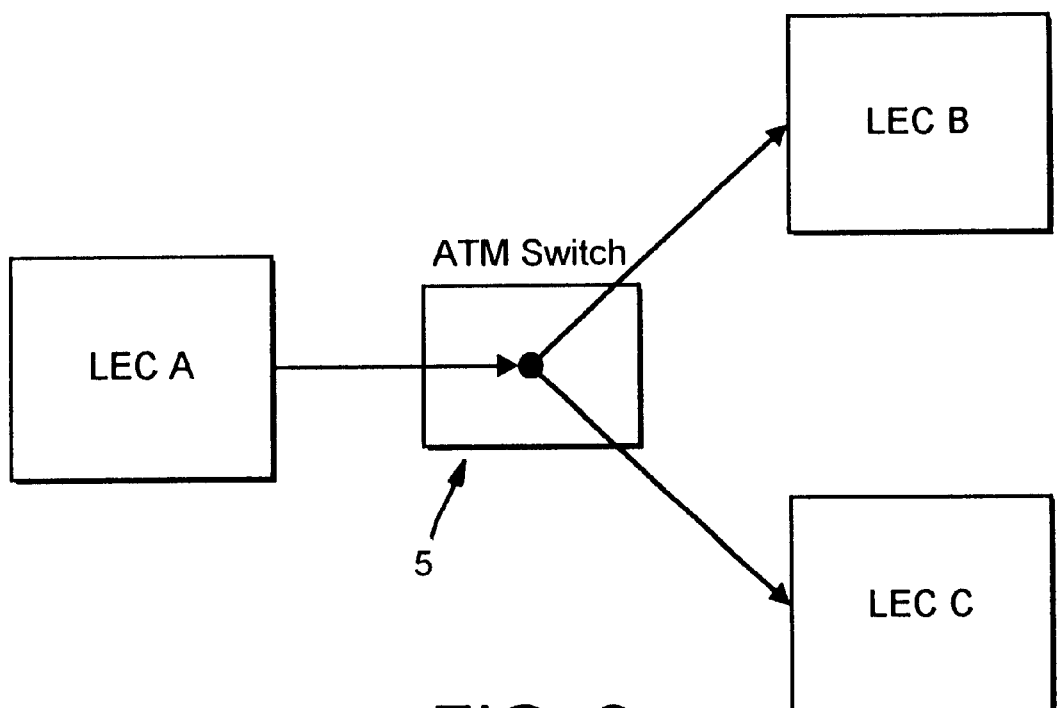
FIG. 2 is a schematic diagram of a mesh form of connection of the members of an emulated lan.

A convenient substitute for a BUS is illustrated in FIG. 2. In the illustrated scheme, packets originating from a lan emulation client LEC A are replicated by an asynchronous transfer mode switch S and are forwarded by the switch forward these to all the other members (LEC B and LEC C) of the respective emulated lan. Similar connections will be set up for packets originating from client LEC B and client LEC C, so that packets originating from any of the three clients reach the other lan emulation clients. There will be such a similar mesh of connections for each emulated lan. Interoperation with other equipment As already mentioned above, a lan emulation client expects to set up a bidirectional multicast send connection to its BUS, whereas the present invention requires setting up a point-to-multipoint connection with other devices in the same emulated lan. Therefore the problem is that 'terminal' devices that support only asynchronous transfer mode lan emulation cannot necessarily interoperate in a network which employs a system of meshes as described in FIG. 1.

A solution to this problem is to employ an interchange LEC (e.g. an asynchronous transfer mode down-link) to act as a BUS for 'terminal LECs' that are unable to participate in a mesh-type network as described above. This is only practical if the number of these terminal LECs connected to any one 'interchange LEC' is small, otherwise the performance of the interchange LEC (down-link) would suffer.

Figure 3:
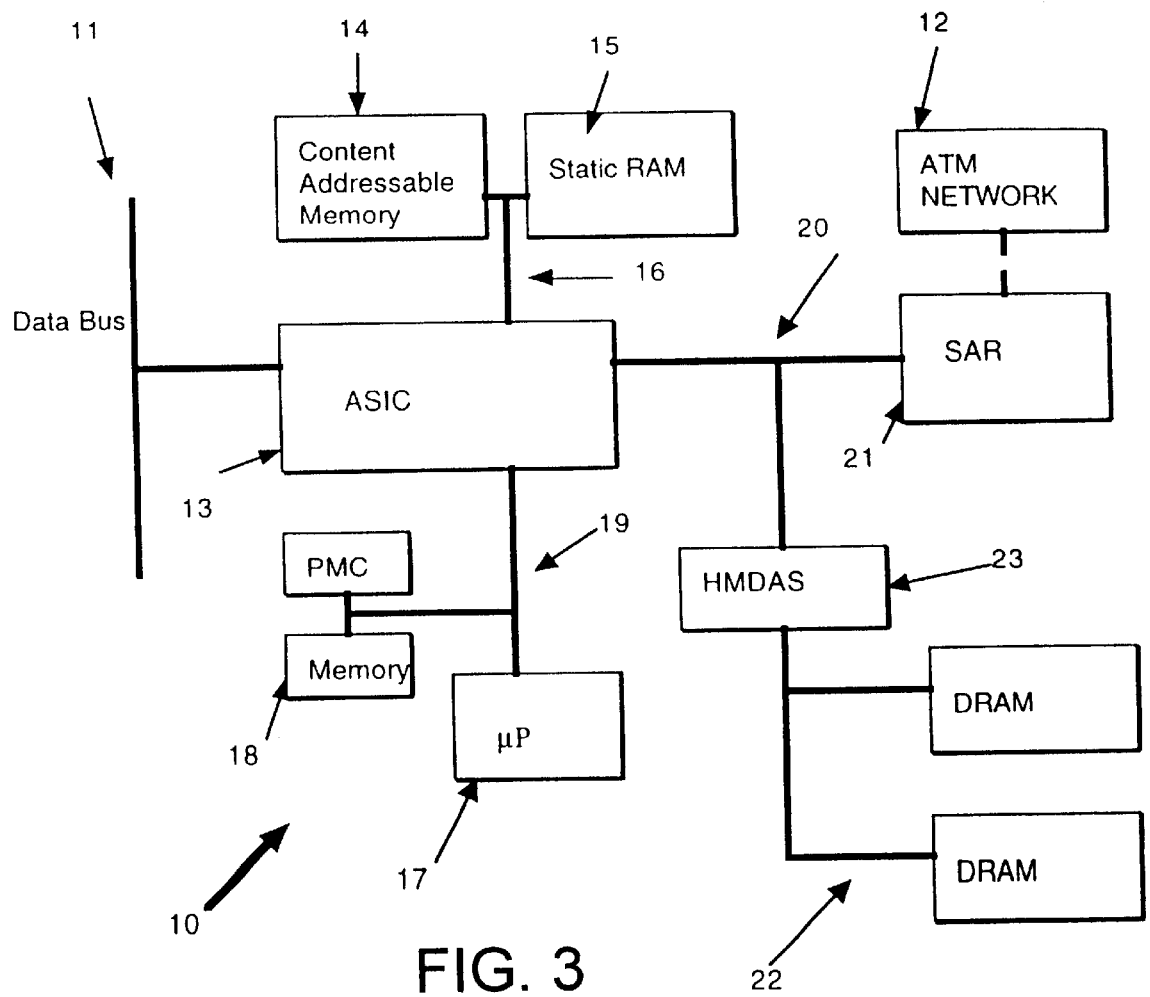
FIG. 3 is a schematic representation of a down link processor

FIG. 3 illustrates schematically the important functional elements of an apparatus 10, conventionally termed an "interface" which provides a connection and signal processing between a data bus 11 and virtual communication channels in a system 12 operated in an asynchronous transfer mode. Connected to the data bus 11 is an asic (application-specific-integrated circuit 13) of which the manner of operation is not directly relevant to the present invention but which will be broadly described in order to provide the context within which the present invention may be more easily understood.

The main components of the apparatus 10 comprise, in addition to the asic 13, a content-addressable memory 14, a static random-access memory 15, an internal data bus 16 connecting the memories 14 and 15 to the asic 13, a microprocessor 17 and an associated memory 18, both connected to the asic 13 by means of an internal data bus 19, an internal data bus 20, a segmentation and reassembly system 21 connected to the asic 13, a large-capacity dynamic random-access memory 22 and a host memory data address switch 23 which provides an interface between the bus 20 and the memory 22. Typically the memory 22 contains at least two mega-bytes of memory space (and optionally substantially more).

The basic requirements for the system of meshes to allow 'terminal LECs' to be connected into the network are as follows.
1. Each terminal LEC sets up a 'multicast send virtual circuit connection' with an interchange LEC acting as the BUS.
2. The asynchronous transfer mode down-link acting as the BUS for an ELAN sets up a multicast forward connection with each of the terminal LECs.
3. Packets received over the multicast send virtual circuit connection from any of the terminal LECs need to be sent to all the interchange LECs over the point-to-multipoint mesh and to all the other terminal LECs over their multicast forward virtual circuit connections.
4. Packets received over the point-to-multipoint mesh from any of the interchange LECs need to be sent to all the terminal LECs over their multicast forward virtual circuit connections.
5. Packets received from an ethernet port, i.e. a data bus, are sent out to the asynchronous transfer mode network over the point-to-multipoint mesh and to the terminal LECs.

The requirements for the interchange LECs are as follows:
1. The interchange LEC itself is included in the point-to-multipoint mesh set up to connect to other similar interchange LECs, i.e. any packet it sends out over this mesh connection also comes back to it. Herein this connection will be called the loopback virtual circuit connection. This is a mechanism by which packets normally going to the BUS are also made available to the downlink processor, This requires the asynchronous transfer mode switch to effectively support a loopback at the same physical port.
2. Any packet received from data bus required to be sent over the point-to-multipoint mesh is received over the loopback virtual circuit connection as described above and sent to a processor. This packet must not be sent back to the data bus. The processor will copy this packet out over the multicast forward virtual circuit connections to the terminal LECs.
3. Any packet received from the point-to-multipoint mesh, i.e. from any of the interchange LECs, needs to be sent to the data bus and also to the processor. The processor will copy this packet out over the multicast forward virtual circuit connections to the terminals LECs. However, packets received over the loopback virtual circuit connection are only sent to the processor.
4. Any packet received over any of the multicast send virtual circuit connections, i.e. from any of the terminal LECs, needs to be sent to the data bus and also to the processor. The processor will ensure that this packet is sent out over the point-to-multipoint mesh to the other interchange LECs and over the multicast forward virtual circuit connections to the terminal LECs, including the one that was the source of the packet. The processor may be arranged either to wait for the packet to be returned over the loopback virtual circuit connection and copy this packet over the multicast forward virtual circuit connections to the terminals or to copy the packet over the point-to-multipoint mesh and the multicast forward virtual circuit connections at the same time (i.e. not real time of course) but then echo suppress the packet when it comes back over the loopback virtual circuit connection.

Figure 4:
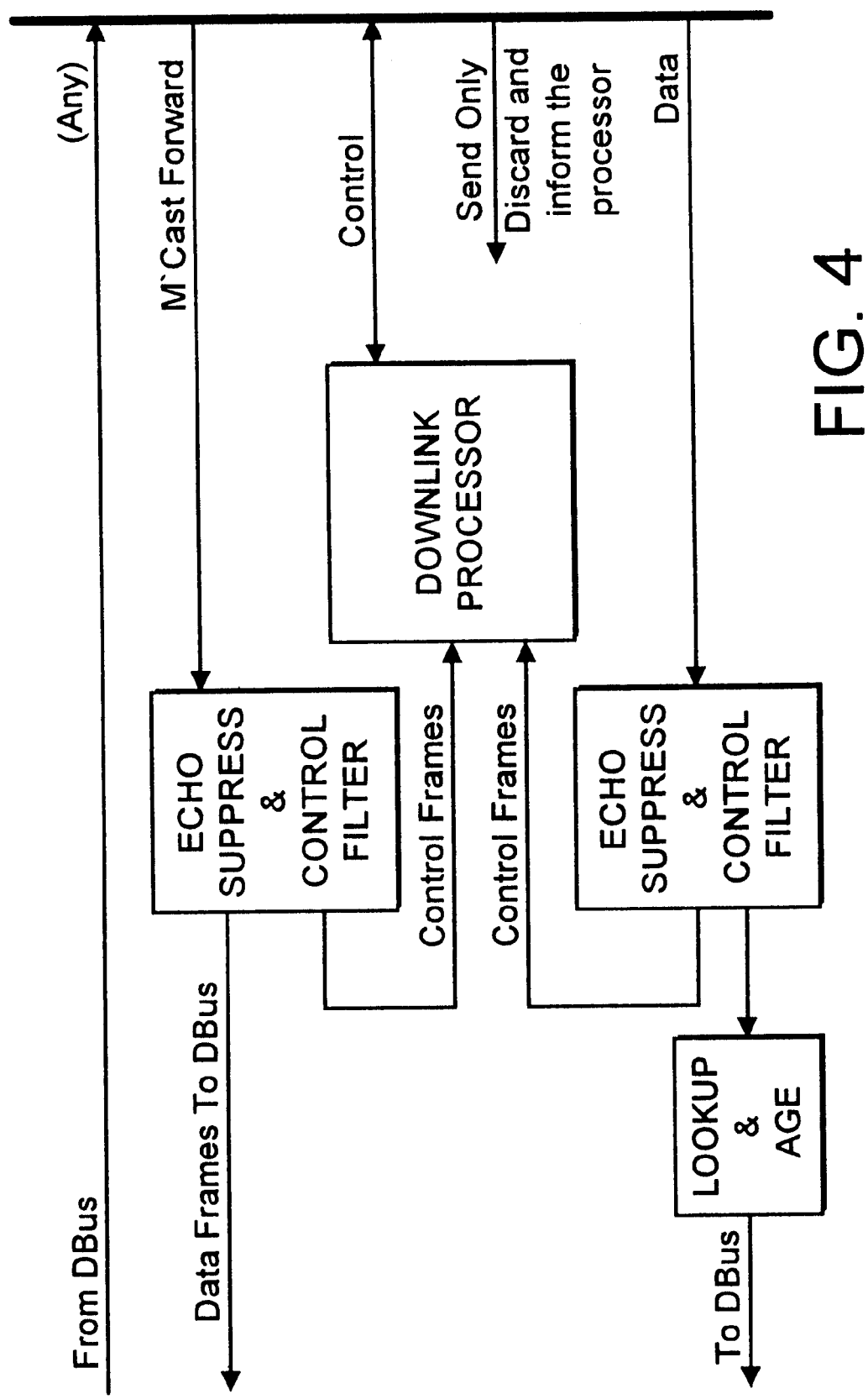
FIG. 4 is a schematic representation of the ordinary signals sent and received by a down link processor.

In the down-link shown in FIG. 3 and described in the aforementioned co-pending applications, four virtual circuit connection types are defined for receiving packets from the asynchronous transfer mode network. They are 'multicast forward', 'control', 'data', and 'send only'. They may be represented in a two-bit field as 01, 10, 00 and 11 respectively. Their usage is illustrated in FIG. 4.

The 'multicast forward' virtual circuit connection is for receiving packets from the BUS. Data packets received over this virtual circuit connection are either echo suppressed (depending on the client) or forwarded to the data bus.

Packets received over the 'control' virtual circuit connection are sent to the downlink processor and no filtering of any kind is carried out.

Packets received over 'data' virtual circuit connections are sent to the data bus and lookup (and ageing) is carried out. Packets received over data circuits should not require echo suppression, but it is advisable to provide echo suppression in the path before the packets are sent to data bus.

Also, control frames need to be filtered off and sent to the processor.

When the downlink is operating in what is known as a normal asynchronous transfer mode, the function of the 'send only' virtual circuit connection is not defined except that the packets received over this virtual circuit connection are discarded and the processor is informed. Normally packets should not arrive on this virtual circuit connection.

When the operation indicated in FIG. 1 is enabled (which may be effected by the setting of a relevant bit in a lan emulation table kept in the static random access memory 15), the receiving behavior will need to be changed as described in the following section.

Figure 5:
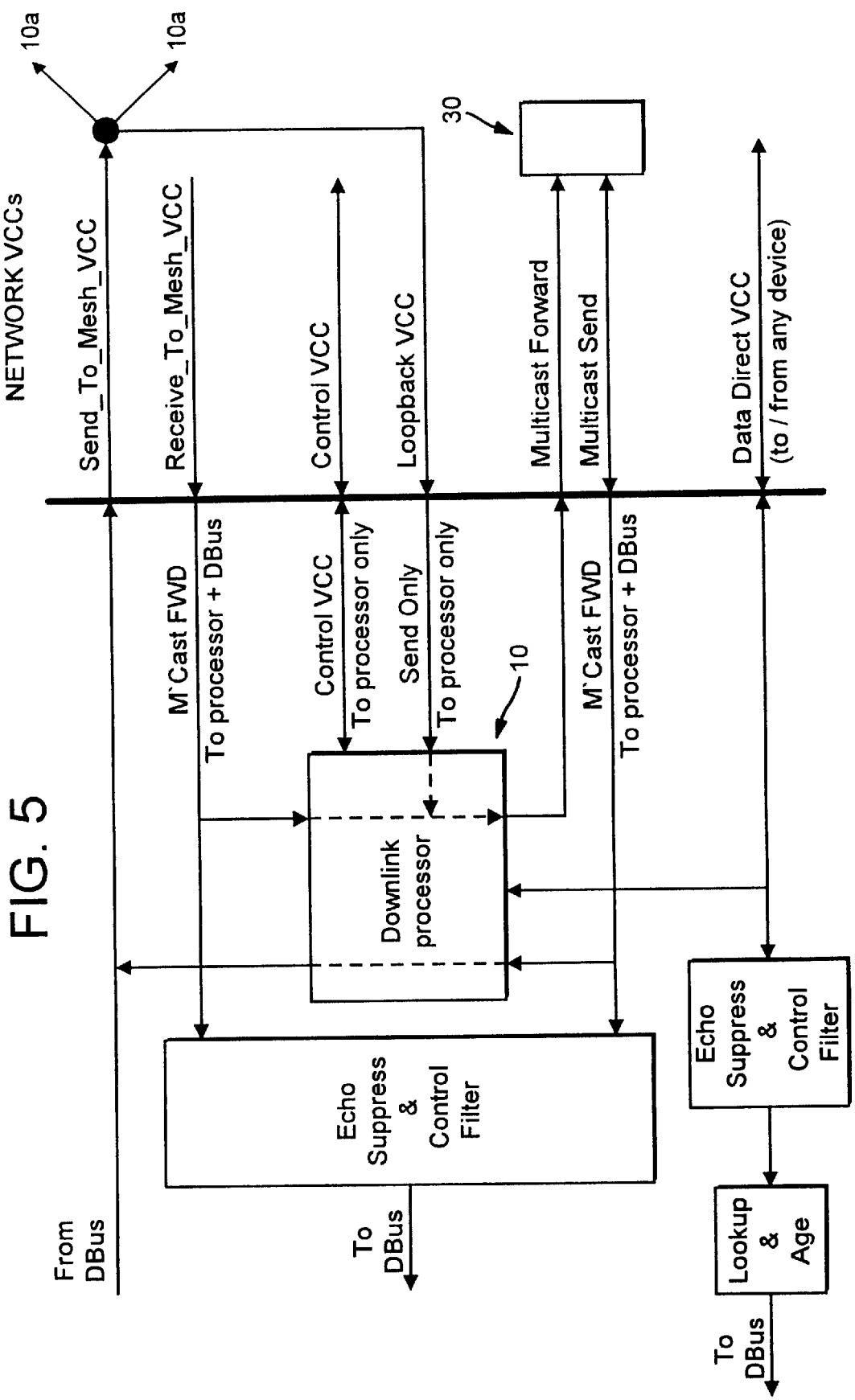
FIG. 5 is a schematic representation of the signals that may be sent to and received by a down link processor in accordance with the invention.

FIG. 5 shows the virtual circuit connections to the downlink that may be set up when it is acting as a BUS for terminal devices as described above. The right hand side shows the network connection (using the standard terminology where possible) and the left hand side shows how these connections may be mapped to receiving types of virtual circuit connections. Using FIG. 4 it may be verified that the requirements of an interchange LEC acting as a BUS for a terminal LEC given above are satisfied. The requirements are restated below.

1. The interchange (i.e. the down-link 10) itself is included in the point-to-multipoint mesh set up to connect to other such interchange LECs 10a, i.e. any packet it sends out over this connection also comes back to it. This requirement is satisfied by the 'send to mesh' virtual circuit connection, the switch S and the loopback virtual circuit connection.

2. Any packet received from the data bus required to be sent over the point-to-multipoint mesh is received over the loopback virtual circuit connection above and sent to the downlink processor. This packet must not be sent back to the data bus. The processor will copy this packet out over the multicast forward virtual circuit connection to the terminal LEC 30. This requirement is met by making the loopback virtual circuit connection a 'send only' virtual circuit connection whereby all packets from this virtual circuit connection are sent to the processor only.

3. Any packet received from the point-to-multipoint mesh, i.e. from any of the devices 10a, needs to be sent to data bus and also to the downlink processor. The processor will also copy this packet out over the multicast forward virtual circuit connection to the terminal LECs.

These connections will be mapped to multicast forward virtual circuit connection type and will be sent to the processor and to the data bus. Flush messages may be received over this virtual circuit connection and need to be removed by filtering. Also it is advisable to carry out echo suppression just for the data bus.

4. Any packet received over any of the multicast send virtual circuit connections, i.e. from a terminal 30, needs to be sent to the data bus and also to the downlink processor 10.

These connections will be mapped to the multicast forward virtual circuit connection type and a packet received from this circuit will be sent to the processor and to the data bus by the down-link. The processor may, as shown, copy the packet out over the point-to-multipoint mesh to the devices 10a and also over multicast forward virtual circuit connections to the terminal LECs including the device that was the source of the packet. An alternative is for the processor to first send the packet over the point-to-multipoint mesh, receive the packets back over the loopback virtual circuit connection and then copy it out to the terminal LECs over the multicast forward virtual circuit connections.

It will be understood that the foregoing is given by way of example only and that a variety of modifications may be made within the spirit and scope of the claims that follow.

We claim:

1. A communication system comprising:

a plurality of interfaces; and an asynchronous transfer mode switch for receiving data packets by way of virtual circuit connections from each of said interfaces, replicating said packets and sending them to said interfaces;

said interfaces are disposed for sending data packets by way of virtual circuit connections and for receiving data packets by way of virtual circuit connections provided by said asynchronous transfer switch;

said interfaces emulate at least one local area network by means of said virtual circuit connections; and said interfaces establish a distributed broadcast and unknown server for the broadcast of data packets throughout the emulated local area network, said distributed broadcast and unknown server comprising a mesh constituted by a multiplicity of point-to-multipoint virtual connections each of which extends by way of said asynchronous transfer mode switch from a respective one of the interfaces to all the other interfaces;

wherein said system includes at least one terminal which is not connectable in said mesh, at least one interface comprises means for mapping virtual circuit connections between said one interface and said terminal into virtual circuit connections in said mesh; and said one interface includes a data bus and a processor, and is thereby disposed (i) to receive back from the mesh any packet sent to said mesh from said one interface; (ii) to send packets from said data bus to said mesh; and (iii) to send to said data bus data packets received from said mesh.

* * * * *